US009026601B1

(12) United States Patent
Gauvin

(10) Patent No.: US 9,026,601 B1

(45) Date of Patent: May 5, 2015

(54) SYSTEMS AND METHODS FOR VALIDATING MEMBERS OF SOCIAL NETWORKING GROUPS

(71) Applicant: Symantec Corporation, Mountain View, CA (US)

(72) Inventor: William Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 254 days.

(21) Appl. No.: 13/796,179

(22) Filed: Mar. 12, 2013

(51) Int. Cl.
*G06F 15/16* (2006.01)
*H04L 29/08* (2006.01)

(52) U.S. Cl.
CPC ..................................... *H04L 67/22* (2013.01)

(58) Field of Classification Search
CPC ..... H04L 67/22; H04L 51/08; H04L 41/0893; H04L 43/028; H04L 43/12
USPC .......... 709/206, 203, 204, 223–225; 705/319; 706/22, 25
See application file for complete search history.

(56) References Cited

U.S. PATENT DOCUMENTS

| | | | | |
|---|---|---|---|---|
| 8,150,779 | B1 * | 4/2012 | Gauvin | 705/319 |
| 2009/0192853 | A1 * | 7/2009 | Drake et al. | 705/7 |
| 2010/0333200 | A1 * | 12/2010 | Chen et al. | 726/22 |
| 2012/0254184 | A1 * | 10/2012 | Choudhary et al. | 707/738 |
| 2013/0191468 | A1 * | 7/2013 | Dichiu et al. | 709/206 |

* cited by examiner

*Primary Examiner* — Ruolei Zong

(74) *Attorney, Agent, or Firm* — ALG Intellectual Property, LLC

(57) ABSTRACT

A computer-implemented method for validating members of social networking groups may include identifying a named social networking group with a plurality of members on a social networking platform, creating a social graph of the named social networking group based at least in part on a plurality of connections on the social networking platform between a plurality of members of the named social networking group, determining a connecting member of the named social networking group that exceeds a predetermined threshold of connections within the social network group, removing the connecting member of the named social networking group from the social graph, and determining that a disconnected member of the social graph may not be a valid member of the named social networking group, based on the disconnected member not meeting a second predetermined threshold of connections within the social graph. Various other methods, systems, and computer-readable media are also disclosed.

20 Claims, 7 Drawing Sheets

SYSTEMS AND METHODS FOR VALIDATING MEMBERS OF SOCIAL NETWORKING GROUPS

BACKGROUND

Social networking platforms are an increasingly popular way for people to connect with friends, colleagues, and those who share common interests. Users can set up profiles, add personal information, make connections, create events, and join groups related to their views, hobbies and activities. Groups may allow users to communicate and coordinate with other users with whom they may not have external relationships.

Unfortunately, untrustworthy individuals may take advantage of social networking groups to masquerade as legitimate associates and communicate with group members under false pretenses. Such individuals may use easily acquired group memberships to launch social engineering attacks, to gain access to organizational information and/or activities intended only for the group, and/or to engage in mass marketing to certain demographics.

Users may be unlikely to check whether each member of a group appears to be legitimate before sharing information with a group. Moreover, users may lack access to sufficient information to make accurate judgments, especially in large and complex social networks. Accordingly, the instant disclosure identifies and addresses a need for additional and improved systems and methods for validating members of social networking groups.

SUMMARY

As will be described in greater detail below, the instant disclosure generally relates to systems and methods for validating members of social networking groups by identifying a group on a social networking platform, creating a social graph based on connections within the group, removing highly connected members from the graph, and determining that disconnected members may not be valid members of the group if they have too few connections once the highly connected members are removed from the social graph.

In one example, a computer-implemented method for validating members of social networking groups may include (1) identifying a named social networking group on a social networking platform, the named social networking group including a plurality of members of the social networking platform, (2) creating a social graph of the named social networking group based at least in part on a plurality of connections on the social networking platform between a plurality of members of the named social networking group, (3) determining a connecting member of the named social networking group that exceeds a predetermined threshold of connections within the named social networking group on the social networking platform, (4) removing, based on determining that the connecting member of the named social networking group exceeds the predetermined threshold, the connecting member of the named social networking group from the social graph, and (5) determining that a disconnected member of the social graph may not be a valid member of the named social networking group, based on the disconnected member not meeting a second predetermined threshold of connections within the social graph after having removed the connecting member from the social graph.

In one embodiment, the computer-implemented method may further include (1) determining that the disconnected member may be an owner of the named social networking group and (2) determining, based on the disconnected member being the owner, that the named social networking group may be untrusted.

In one embodiment, the computer-implemented method may further include (1) intercepting a message intended for the named social networking group and (2) sending the message to a subset of the plurality of members of the named social networking group excluding at least the disconnected member.

In some examples, the computer-implemented method may further include warning a user, based on determining that the disconnected member of the social graph may be not the valid member of the named social networking group, that the disconnected member may be untrusted.

In some examples, the computer-implemented method may further include removing the disconnected member from the named social networking group based on determining that the disconnected member of the social graph may be not the valid member of the named social networking group.

In some examples, the computer-implemented method may further include hiding the named social networking group from the disconnected member based on determining that the disconnected member of the social graph may not be the valid member of the named social networking group.

In some examples, the computer-implemented method may further include weighting the social graph based on at least one connection on the social networking platform within the named social networking group.

In one embodiment, the plurality of connections on the social networking platform may include (1) a social networking platform relationship, (2) a message, (3) a wall post, (4) a comment, (5) shared profile information, and/or (6) membership in an additional named social networking group In one embodiment, the computer-implemented method may further include (1) intercepting a message from a user intended for the named social networking group and (2) sending the message to a subset of the plurality of members of the named social networking group excluding at least one untrusted member based on at least one previous negative social networking platform interaction between the user and the untrusted member.

In one embodiment, a system for implementing the above-described method may include (1) an identification module programmed to identify a named social networking group on a social networking platform, the named social networking group including a plurality of members of the social networking platform, (2) a creation module programmed to create a social graph of the named social networking group based at least in part on a plurality of connections on the social networking platform between a plurality of members of the named social networking group, (3) a connection determination module programmed to determine a connecting member of the named social networking group that may exceed a predetermined threshold of connections within the named social networking group on the social networking platform, (4) a removing module programmed to remove, based on determining that the connecting member of the named social networking group may exceed the predetermined threshold, the connecting member of the named social networking group from the social graph, (5) a validity determination module programmed to determine that a disconnected member of the social graph may not be a valid member of the named social networking group, based on the disconnected member not meeting a second predetermined threshold of connections within the social graph after having removed the connecting member from the social graph, and (6) at least one processor configured to execute the identification module, the creation module, the connection determination module, the removing module and the validity determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a named social networking group on a social networking platform, the named social networking group including a plurality of members of the social networking platform, (2) create a social graph of the named social networking group based at least in part on a plurality of connections on the social networking platform between a plurality of members of the named social networking group, (3) determine a connecting member of the named social networking group that exceeds a predetermined threshold of connections within the named social networking group on the social networking platform, (4) remove, based on determining that the connecting member of the named social networking group exceeds the predetermined threshold, the connecting member of the named social networking group from the social graph, and (5) determine that a disconnected member of the social graph may not be a valid member of the named social networking group, based on the disconnected member not meeting a second predetermined threshold of connections within the social graph after having removed the connecting member from the social graph.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
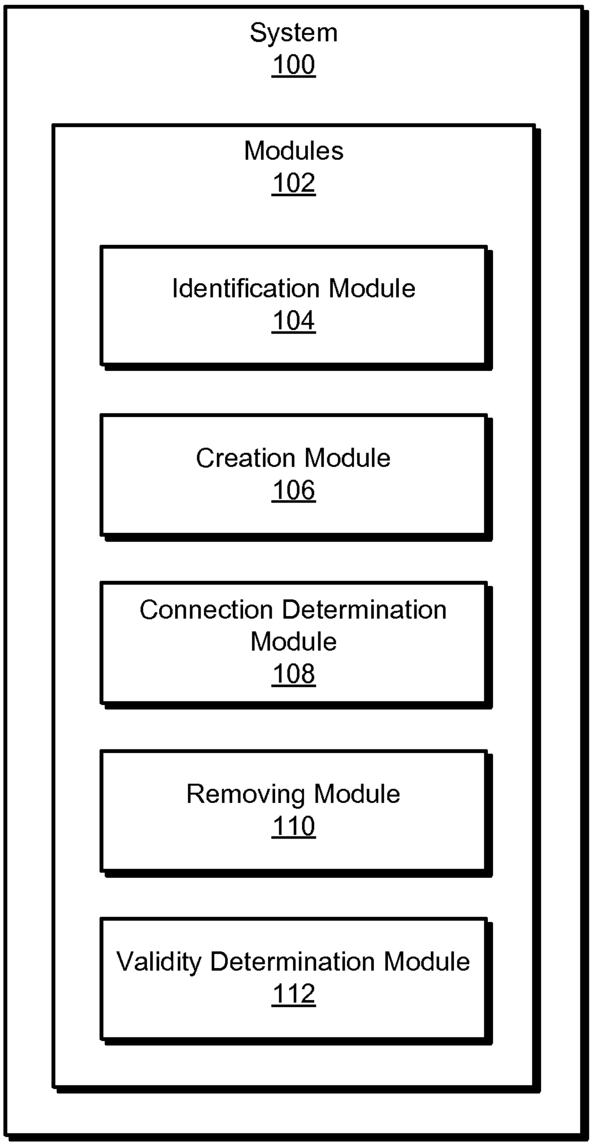
FIG. 1 is a block diagram of an exemplary system for validating members of social networking groups.
Figure 2:
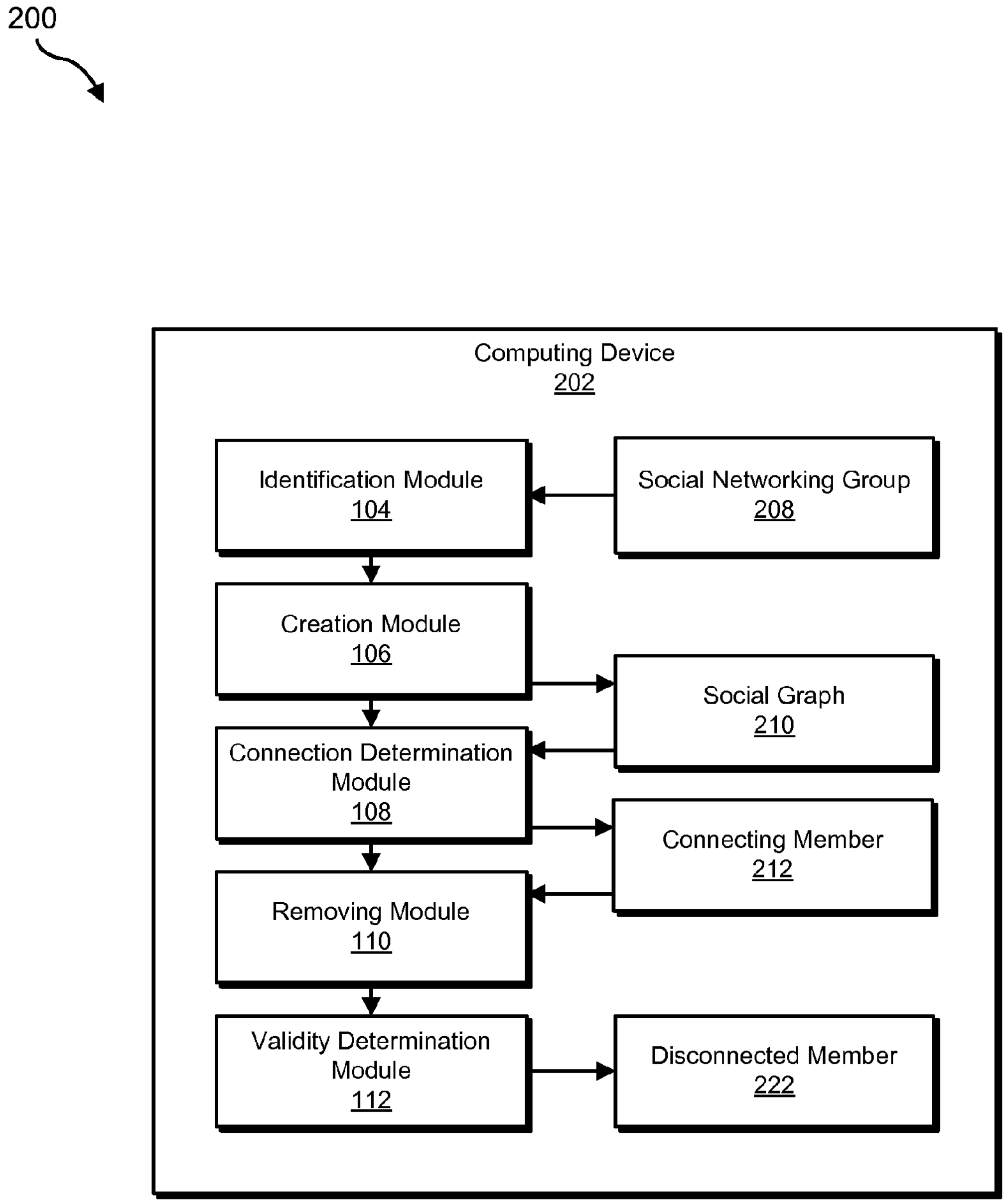
FIG. 2 is a block diagram of an exemplary system for validating members of social networking groups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for validating members of social networking groups. As will be explained in greater detail below, creating a social graph of members of a social networking group, removing connecting members, and determining disconnected members may be an efficient way of determining potentially invalid members of groups which can allow users to avoid sending messages to suspicious group members, steer users clear of groups with suspicious owners, and/or hide groups in which users may not be interested.

The following will provide, with reference to FIGS. 1-2 and 4-5, detailed descriptions of exemplary systems for validating members of social networking groups. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for validating members of social networking groups. As illustrated in this figure, exemplary system 100 may include one or more modules 102 for performing one or more tasks. For example, and as will be explained in greater detail below, exemplary system 100 may also include an identification module 104 programmed to identify a named social networking group on a social networking platform, the named social networking group including a plurality of members of the social networking platform. Exemplary system 100 may additionally include a creation module 106 programmed to create a social graph of the named social networking group based at least in part on a plurality of connections on the social networking platform between a plurality of members of the named social networking group. Exemplary system 100 may also include a connection determination module 108 programmed to determine a connecting member of the named social networking group that may exceed a predetermined threshold of connections within the named social networking group on the social networking platform. Exemplary system 100 may additionally include a removing module 110 programmed to remove, based on determining that the connecting member of the named social networking group may exceed the predetermined threshold, the connecting member of the named social networking group from the social graph. Exemplary system 100 may also include a validity determination module 112 programmed to determine that a disconnected member of the social graph may not be a valid member of the named social networking group, based on the disconnected member not meeting a second predetermined threshold of connections within the social graph after having removed the connecting member from the social graph. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. Computing device 202 may be programmed with one or more of modules 102.

In one embodiment, one or more of modules 102 from FIG. 1 may, when executed by at least one processor of computing device 202, facilitate computing device 202 in validating members of social networking groups. For example, and as will be described in greater detail below, one or more of modules 102 may cause computing device 202 to validating members of social networking groups. For example, and as will be described in greater detail below, identification module 104 may be programmed to identify a social networking group 208 on a social networking platform, social networking group 208 including a plurality of members of the social networking platform. Creation module 106 may be programmed to create a social graph 210 of social networking group 208 based at least in part on a plurality of connections on the social networking platform between a plurality of members of social networking group 208. Connection determination module 108 may be programmed to determine a connecting member 212 of social networking group 208 that may exceed a predetermined threshold of connections within social networking group 208 on the social networking platform. Removing module 110 may be programmed to remove, based on determining that connecting member 212 of social networking group 208 may exceed the predetermined threshold, connecting member 212 of social networking group 208 from social graph 210. Validity determination module 112 may be programmed to determine that a disconnected member 222 of social graph 210 may be not a valid member of social networking group 208, based on disconnected member 222 not meeting a second predetermined threshold of connections within social graph 210 after having removed connecting member 212 from social graph 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Figure 3:
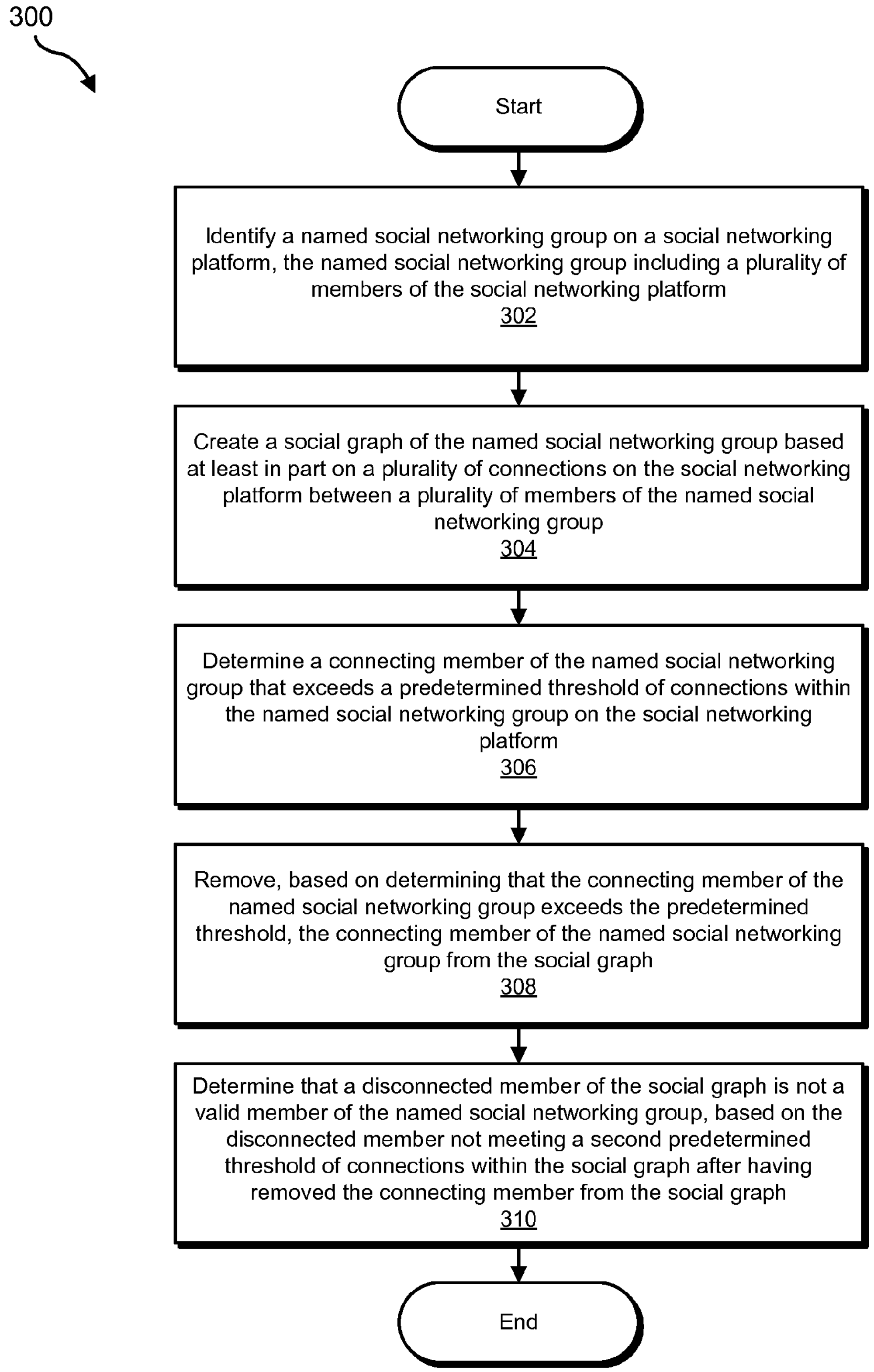
FIG. 3 is a flow diagram of an exemplary method for validating members of social networking groups.

FIG. 3 is a flow diagram of an exemplary computer-implemented method 300 for validating members of social networking groups. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a named social networking group on a social networking platform, the named social networking group including a plurality of members of the social networking platform. For example, at step 302 identification module 104 may, as part of computing device 202 in FIG. 2, identify social networking group 208 on a social networking platform, social networking group 208 including a plurality of members of the social networking platform.

For example, identification module 104 may identify a named group on a social networking platform. The named group may be a political interest group, a geographical group, a hobby group, an interest group, a religious group, and/or a fan group. The group may include any number of members of the social networking platform, which may be members of the group in a number of ways. Group members may add content to the group, post on the group's page, serve administrative functions within the group, and/or be part of a public list of members of the group. The group may be open for anyone on the social networking platform to join, may require an invitation, and/or may be invisible to non-members.

In one example, identification module 104 may identify a web security professionals group on the social networking platform FACEBOOK, which may include a number of FACEBOOK members who are interested in Internet security. In this example the group may be named "Web Security Professionals."

In some embodiments, identification module 104 may be part of a web-browser plug-in intended to increase the security of its users. In some embodiments, identification module 104 may be a part of the social networking platform.

As used herein, the phrase "social networking platform" may refer to any computing device and/or devices, software framework, and/or combination thereof usable for providing and/or hosting a service (e.g., via the Internet). In some examples, the phrase "social networking platform" may refer to a platform that provides a social networking service. As used herein, the phrase "social networking service" may refer to any service and/or Internet site that manages social connections and/or shares, compiles, formats, and/or broadcasts information based on social connections. Examples of social networking platforms may include FACEBOOK, TWITTER, LINKEDIN, REDDIT, and GOOGLE+. In some examples, the online service may host data and/or process the data via cloud-based applications (e.g., web-based email clients, online calendar applications, online picture albums, etc.) for personal and/or private use. Additionally or alternatively, the phrase "social networking service" as used herein may refer to any of a variety of online services that enable users to submit, post, and/or transmit messages and that maintain information about users. For example, the phrase "social networking service" as used herein may refer to online shopping services (e.g., EBAY), online gaming services (e.g., HI5), online entertainment services (e.g., YOUTUBE), etc.

As used herein, the phrases "named social networking group" or "social networking group" may refer to any supported means of grouping users on a social networking platform. Examples of named social networking groups include, without limitation, groups created by the social networking platform administrators, groups created by social networking platform users, and/or groups created by corporate accounts. In various examples, groups may be public (e.g., allowing any user of the social network platform and/or any Internet user to view group information and/or interact with the group), semi-private (e.g., allowing partial use of the group by non-group-members, or private (e.g., excluding non-group-members from most and/or all information and/or functionality). Groups may have some functions, including but not limited to messaging all members of the group, adding content to the group page, and/or commenting on content on the group page, which may be restricted to group members.

At step 304 one or more of the systems described herein may create a social graph of the named social networking group based at least in part on a plurality of connections on the social networking platform between a plurality of members of the named social networking group. For example, at step 304 creation module 106 may, as part of computing device 202 in FIG. 2, create a social graph 210 of social networking group 208 based at least in part on a plurality of connections on the social networking platform between a plurality of members of social networking group 208.

For example, creation module 106 may create a graph representing the group, with members represented as vertices and connections represented as edges. In some embodiments, this may be an undirected graph where any connection on the social networking platform between two members may create an edge between those members on the graph. Creation module 106 may use any suitable data structure to represent the graph.

In one example, creation module 106 may create a social graph representing members of the Web Security Professionals FACEBOOK group. There may be a member named Jim who may be FACEBOOK friends with group members Dave, Eve, and Alice, a member named Bob who may be friends with Dave and Alice, and/or a member named Mike who may be friends with Jim and Alice.

In some embodiments, the plurality of connections on the social networking platform may include at least one of (1) a social networking platform relationship, (2) a message, (3) a wall post, (4) a comment, (5) shared profile information, and/or (6) membership in an additional named social networking group.

Examples of a social networking platform relationship include but are not limited to the FACEBOOK "friend" relationship and/or the LINKEDIN "connection" relationship. A message may include a message from one group member to another, a message to both group members, and/or a message thread including responses from both group members. Examples of a wall post may include any post made by one member on another member's profile page. Examples of a comment may include a comment on a member's profile page, a comment on a link or article posted by a member, and/or a reply to a comment posted by a member. Shared profile information may include political and/or religious affiliation, scholastic affiliation, geographic information, and/or any other affiliation or preference that two group members may have in common with each other and/or the group. Membership in an additional named social networking group may include any group or network on the social networking platform.

Figure 4:
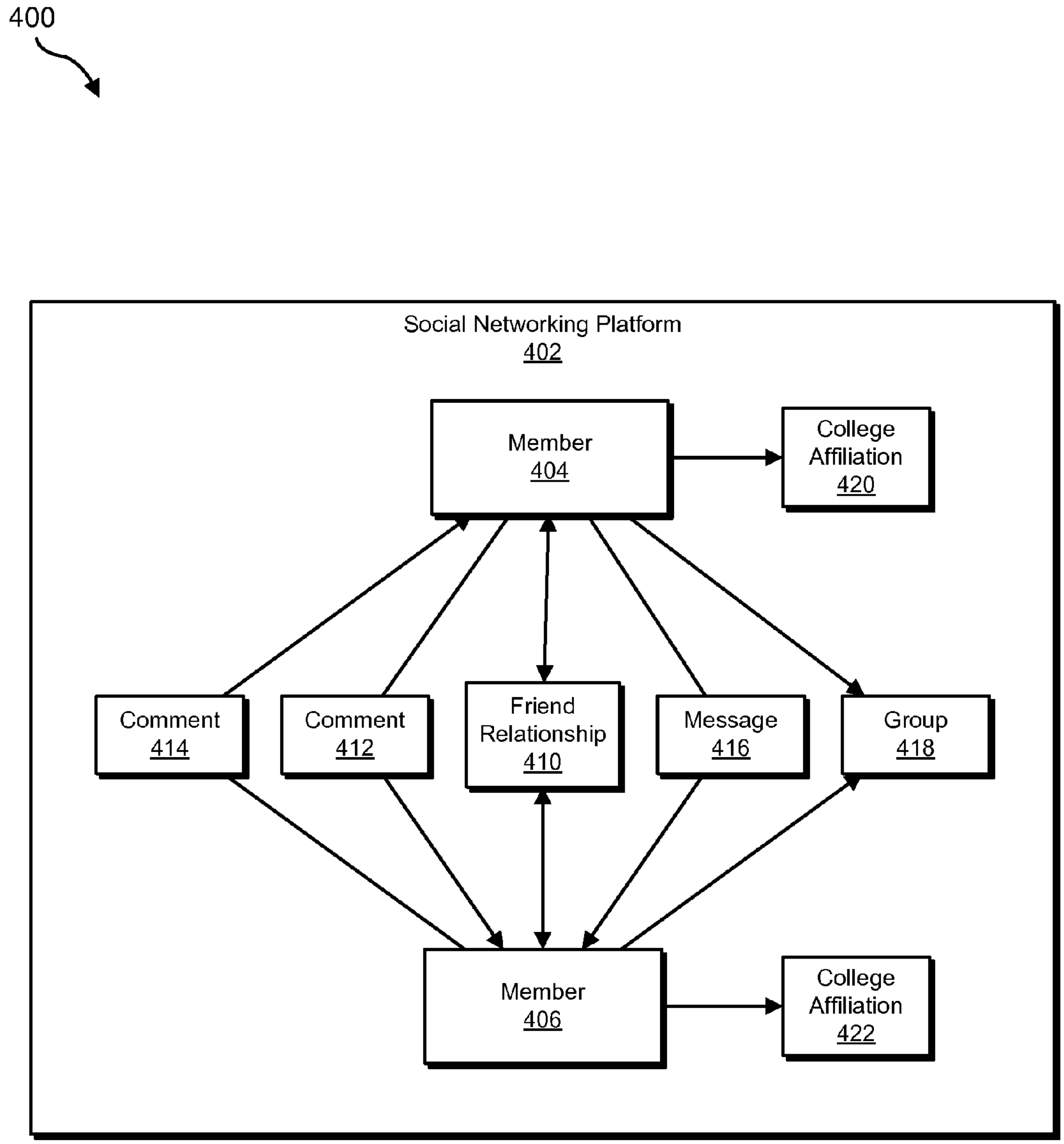
FIG. 4 is a block diagram of an exemplary system for validating members of social networking groups.

FIG. 4 is a block diagram of an exemplary computing system 400 for validating members of social networking groups. As illustrated in FIG. 4, member 404 and member 406 may be members of social networking platform 402. Member 404 and member 406 may be mutually connected by friend relationship 410. Member 406 may have posted comment 414 on member 404's profile. Member 404 may have posted comment 412 on member 406's profile and/or sent message 416 to member 406. Member 404 and member 406 may both be members of group 418. Member 404 may have college affiliation 420 listed on their profile, and/or member 406 may have college affiliation 422 listed on their profile.

In some examples, member 406 may be considered connected to member 404 based on any or all of the messages and/or comments exchanged. Member 404 may also be considered connected to member 406 due to friend relationship 410, and/or due to their mutual membership in group 418. Member 404 may additionally be considered connected to 406 in cases where college affiliation 420 represents the same college affiliation as college affiliation 422.

In some embodiments, creation module 106 may weight the social graph based on at least one connection on the social networking platform within the named social networking group. For example, group members which communicate with each other outside the group and/or have similar profile information to each other may be represented by a higher weight edge between those vertices. In some examples, messages themselves may be weighted on a decreasing scale, so that, for example, one hundred messages between two users may not increase the weight of the edge by ten times as much as ten messages between those same users. Profile information that matches the focus of the group may also contribute to weight. For example, a member of a university group who has the university listed on their profile may have higher weight edges with other members of the group.

In one example, the edge between Bob and Alice may have a weight of "5," because Bob may list his profession as "web security analyst," Bob and Alice may be friends, may each have posted on the other's wall, and may have expressed the same political affiliation on their profiles. The edge between Jim and Eve may only have a weight of "1," because Jim and Eve may be friends but may have exchanged no communication and may have no profile information in common.

Returning to FIG. 3, at step 306 one or more of the systems described herein may determine a connecting member of the named social networking group that exceeds a predetermined threshold of connections within the named social networking group on the social networking platform. For example, at step 306 connection determination module 108 may, as part of computing device 202 in FIG. 2, determine a connecting member 212 of social networking group 208 that may exceed a predetermined threshold of connections within social networking group 208 on the social networking platform.

Examples of a predetermined threshold may include a percentage of the group, such as 75% or 90%, and/or an absolute number of connections, such as 50 or 100 connections, and/or a number of connections relative to other members of the group, such as the highest and/or second-highest connected members of the group. In some embodiments featuring weighted social graphs, the predetermined threshold may also be based on the weight of the connections.

For example, connection determination module 108 may determine a connecting member that may share at least one connection with each of more than 90% of the members of the group. In one example, Jim may attempt to add as a friend anyone who joins the group, so he may be friends with nineteen of the twenty members of the Web Security Professionals group and therefore may be a connecting member.

Figure 5:
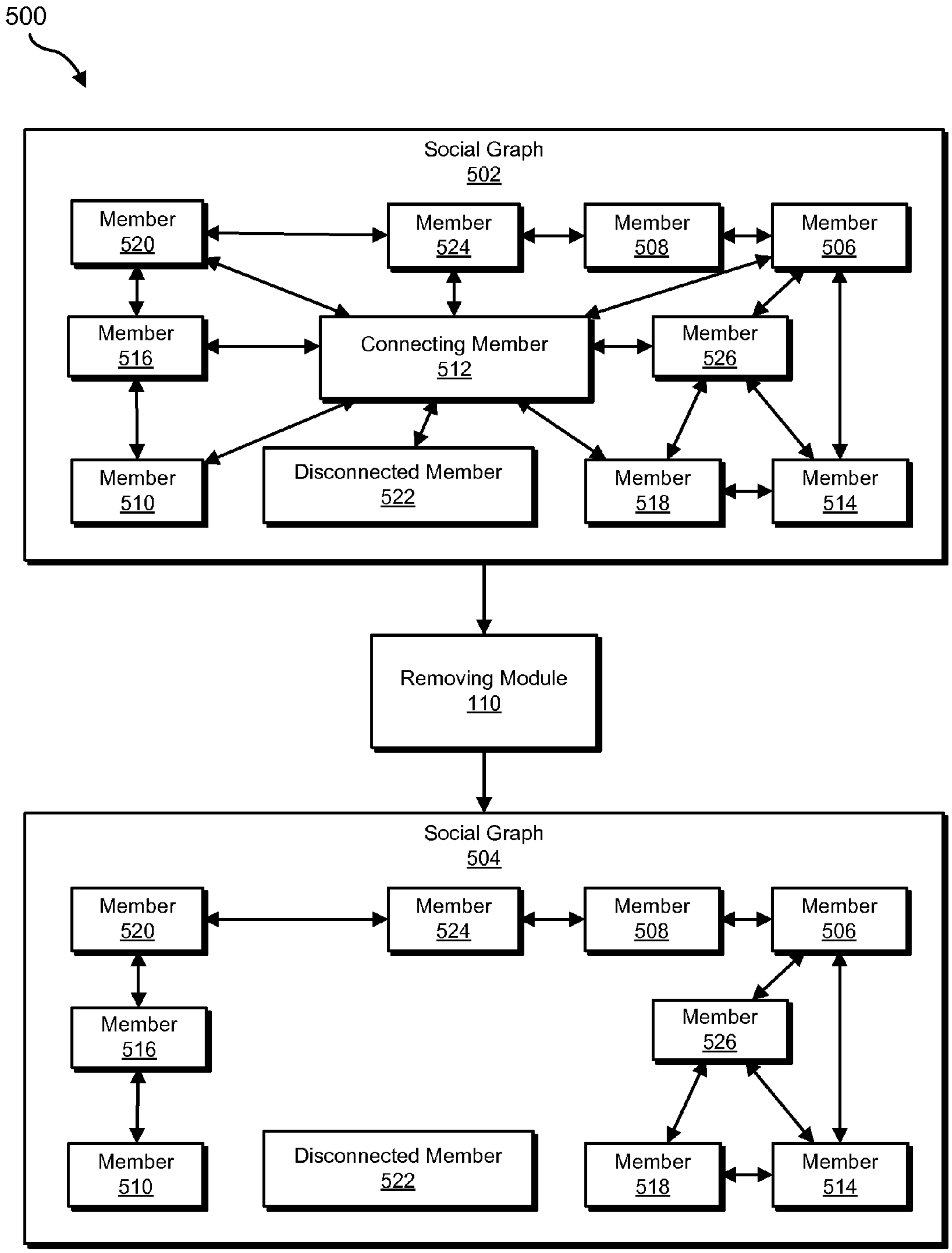
FIG. 5 is a block diagram of an exemplary system for validating members of social networking groups.

FIG. 5 is a block diagram of an exemplary computing system 500 for validating members of social networking groups. As illustrated in FIG. 5, social graph 502 may include a connecting member 512, a disconnected member 522, and members 506, 508, 510, 514, 516, 518, 520, 524, and member 526. Connecting member 512 may be connected to nine out of ten of the other members of the graph, and therefore may be a highly-connecting member. Using FIG. 5 as an example, at step 306 creation module 106 may create social graph 502.

Returning to FIG. 3, at step 308 one or more of the systems described herein may remove, based on determining that the connecting member of the named social networking group exceeds the predetermined threshold, the connecting member of the named social networking group from the social graph. For example, at step 308 removing module 110 may, as part of computing device 202 in FIG. 2, remove, based on determining that connecting member 212 of social networking group 208 may exceed the predetermined threshold, connecting member 212 of the named social networking group 208 from social graph 210.

For example, removing module 110 may remove a vertex representing a highly connected member from the social graph and regenerate and/or modify the social graph without the vertex or the edges connected to the vertex. In one example, removing module 110 may remove Jim from the social graph representing the members of the Web Security Professionals group and regenerate the social graph with only the remaining members of the group.

Returning to FIG. 5, removing module 110 may remove connecting member 512, thus creating social graph 504. Social graph 504 may include all of the members from social graph 502 except connecting member 512.

Returning to FIG. 3, at step 310 one or more of the systems described herein may determine that a disconnected member of the social graph is not a valid member of the named social networking group, based on the disconnected member not meeting a second predetermined threshold of connections within the social graph after having removed the connecting member from the social graph. For example, at step 310 validity determination module 112 may, as part of computing device 202 in FIG. 2, determine that a disconnected member 222 of social graph 210 may not be a valid member of social networking group 208, based on disconnected member 222 not meeting a second predetermined threshold of connections within social graph 210 after having removed connecting member 212 from social graph 210.

Examples of a second predetermined threshold may include a percentage, such as 10% or 20% of the members of the group, an absolute number, such as zero, one, or two connections with other members of the group, and/or a relative number, such as the fewest and/or second-fewest number of connections in the group. In some embodiments featuring weighted social graphs, the second predetermined threshold may also be based on the weight of the connections.

For example, validity determination module 112 may determine that a member which has no connections in the social graph once the connecting member has been removed may be a disconnected member and thus may not be a valid member of the social networking group. In one example, validity determination module 112 may determine that a member which has no connections of a weight higher than 2 may be a disconnected member.

For example, once Jim is removed from the social graph Eve may have no connections within the social graph, and thus may be an invalid member of the Web Security Professionals group.

Returning to FIG. 5, social graph 504 may include disconnected member 522, which may have no connections with any other member of social graph 504 and may therefore be an invalid member of the social networking group. Member 510 may only have one connection with another member of the social graph and may also be a disconnected member which may be an invalid member of the social networking group.

In some embodiments, validity determination module 112 may additionally determine that the disconnected member may be an owner of the named social networking group, and also determine, based on the disconnected member being the owner, that the named social networking group may be untrusted. For example, the owner of the social networking group may have no connections to other members of the social networking platform and may not be a legitimate user. In one example, a malicious user may create a social networking group for the sole purpose of harvesting information from other members of the group for use in spamming, phishing scams and/or similar malicious activity. In this example, systems described herein may warn users about the suspicious nature of the group created by the malicious user.

In some examples, one or more of the systems described herein may facilitate the exclusion of the disconnected member from full participation in the social networking group. For example, in some embodiments, one or more of the systems described herein may intercept a message intended for the named social networking group and send the message to a subset of the plurality of members of the named social networking group excluding at least the disconnected member. For example, a user may be attempting to send a message to the entire membership of the group and systems described herein may remove disconnected members from the list of recipients of the message. In one example, Jim may send out an announcement about the next Web Security Professionals group meeting, a web browser plug-in may intercept the message and may determine that Eve may not be a valid member of the group, and the web browser plug-in may send the message individually to all of the group members excluding Eve.

In some embodiments, one or more of the systems described herein may warn a user, based on determining that the disconnected member of the social graph may not be the valid member of the named social networking group, that the disconnected member may be untrusted. In some embodiments, systems described herein may include a part of a web browser plug-in which may display a warning when the user may be attempting to interact with the disconnected member. In some embodiments, systems described herein may create an ordered list, wherein members are ordered from least to most trusted based at least in part on the social graph, profile information, and/or previous interaction with the user. For example, Bob may be about to send a message to the Web Security Professionals group and may receive a warning that the message will also be sent to Eve, who may be untrusted.

In some embodiments, one or more of the systems described herein may remove the disconnected member from the named social networking group based on determining that the disconnected member of the social graph may not be the valid member of the named social networking group. In some examples, systems described herein may be a part of the social networking platform and may automatically remove disconnected members from groups on the social networking platform. For example, a script on the social networking platform may determine that Eve may not be a valid member of the Web Security Professionals group and may remove her account from membership in the group.

In some embodiments, one or more of the systems described herein may hide the named social networking group from the disconnected member based on determining that the disconnected member of the social graph may not be the valid member of the named social networking group. For example, the disconnected member may not be an existing member of the group and may be perusing a list of groups to join. In this example, the group may not be visible on the list of groups because the disconnected member may lack connections to other members of the group. In one example, a user from Canada may be looking for groups to join and may not see a group about an American college's football team, because the user may not be friends with or have ever interacted with members of the group.

In some embodiments, one or more of the systems described herein may intercept a message from a user intended for the named social networking group and send the message to a subset of the plurality of members of the named social networking group, excluding at least one untrusted member based on at least one previous negative social networking platform interaction between the user and the untrusted member. In some examples, a user may have refused and/or terminated a social networking platform relationship with an untrusted member of the group and systems described herein may prevent messages from the user from being sent to the untrusted member. For example, Alice may have unfriended Eve and may send a message to the members of the Web Security Professionals group excluding Eve.

As explained above in connection with method 300 in FIG. 3, a computing device may identify named social networking group on a social networking platform. The computing device may create a social graph representing the group. The graph may be weighted or unweighted, and may be based on connections including relationships, messages, comments, and/or similar profile information.

The computing device may determine a connecting member who meets a predetermined threshold for connections, such as 90% connectivity or 100 connections. The connecting member may be a person who attempts to connect with every member of the group based solely on their group membership, and thus may cause the social graph to appear to include more legitimate connections than otherwise. The computing device may remove the connecting member and regenerate the social graph.

Once the connecting member has been removed, there may be a member who does not meet a second predetermined threshold for connections. The disconnected member may have zero or very few connections on the social networking platform that are not with the connecting member, and may not be a valid member of the group. The disconnected member may simply be a new member to the group, but they also may be an account created by a malicious user. If the disconnected member is the owner of the group, the entire group may have been created by a malicious user. Systems described herein may remove the disconnected member from the group, show warnings about the disconnected member, and/or intercept messages directed at the disconnected member in order to protect users from the potentially malicious disconnected member.

Figure 6:
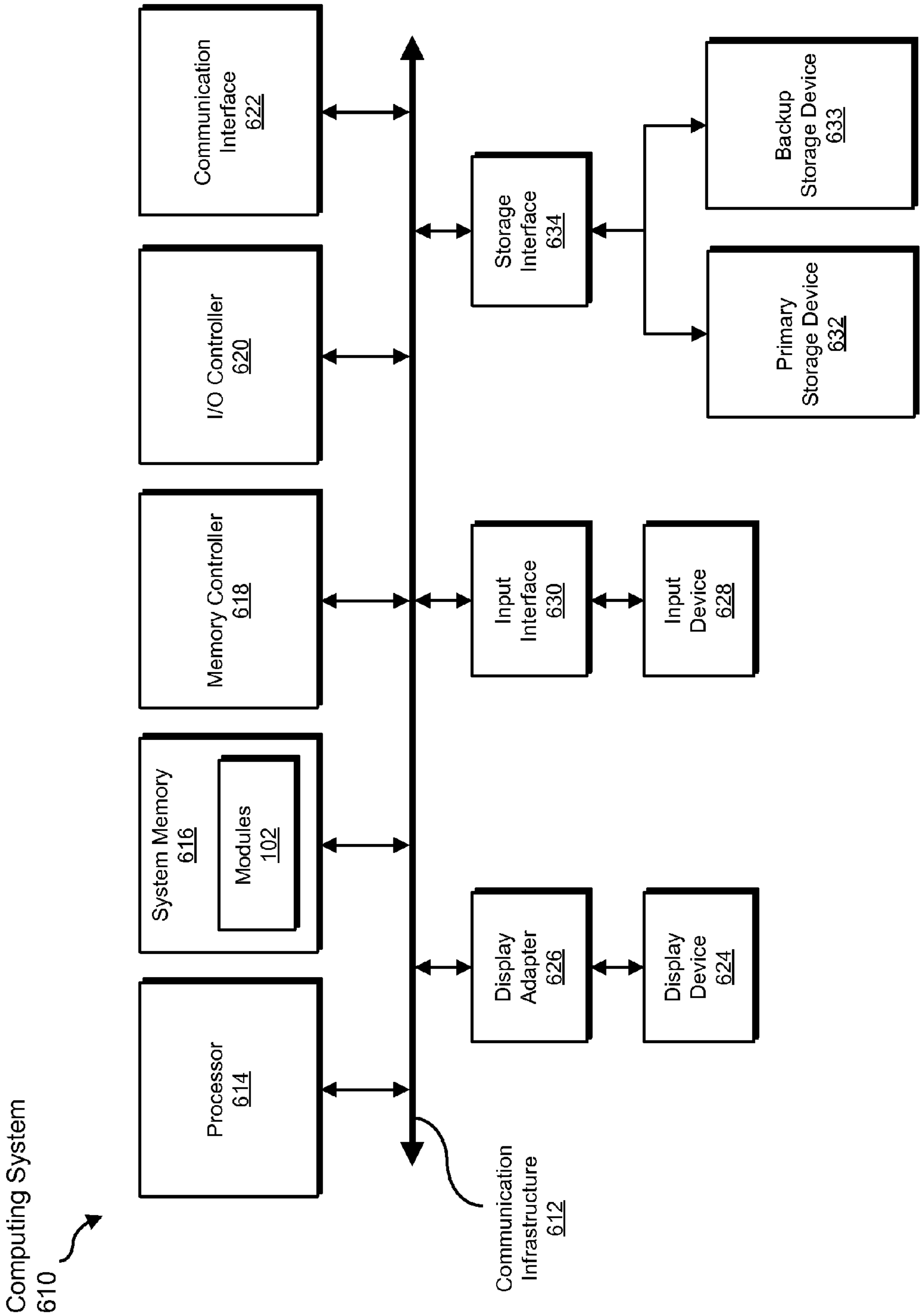
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, creating, determining, removing, intercepting, sending, warning, hiding, weighting, and sending steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
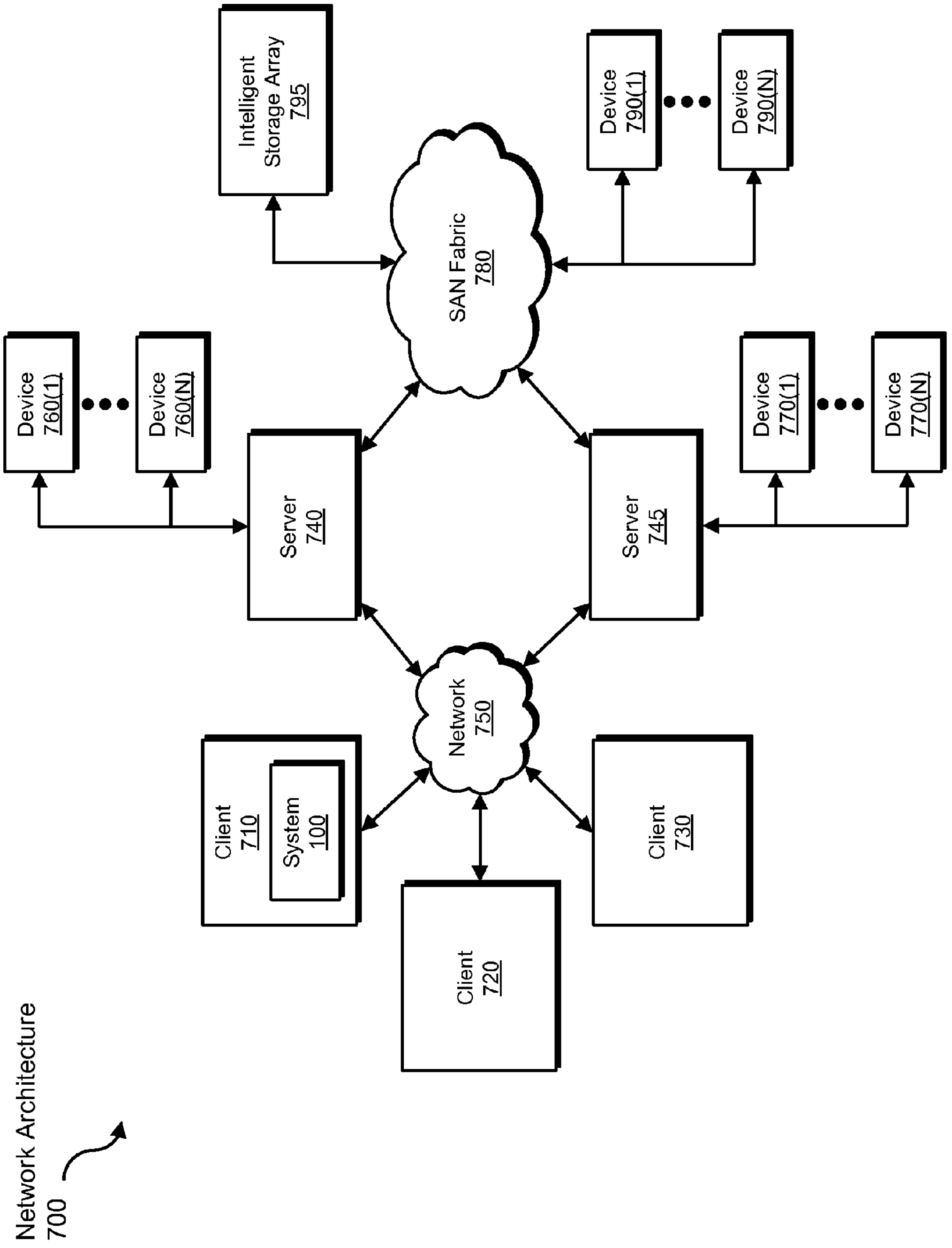
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, creating, determining, removing, intercepting, sending, warning, hiding, weighting, and sending steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for validating members of social networking groups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive social networking platform connections to be transformed, transform the social networking platform connections, output a result of the transformation to a social graph, use the result of the transformation to validate members, and store the result of the transformation to a computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for validating members of social networking groups, at least a portion of the method being performed by a computing device comprising at least one processor, the method comprising:

identifying a named social networking group on a social networking platform, the named social networking group comprising a plurality of members of the social networking platform;

creating a social graph of the named social networking group based at least in part on a plurality of connections on the social networking platform between a plurality of members of the named social networking group;

determining a connecting member of the named social networking group that exceeds a predetermined threshold of connections within the named social networking group on the social networking platform;

removing, based on determining that the connecting member of the named social networking group exceeds the predetermined threshold, the connecting member of the named social networking group from the social graph;

determining that a disconnected member of the social graph is not a valid member of the named social networking group, based on the disconnected member not meeting a second predetermined threshold of connections within the social graph after having removed the connecting member from the social graph.

2. The computer-implemented method of claim 1, further comprising:

determining that the disconnected member is an owner of the named social networking group;

determining, based on the disconnected member being the owner, that the named social networking group is untrusted.

3. The computer-implemented method of claim 1, further comprising:

intercepting a message intended for the named social networking group;

sending the message to a subset of the plurality of members of the named social networking group excluding at least the disconnected member.

4. The computer-implemented method of claim 1, further comprising warning a user, based on determining that the disconnected member of the social graph is not the valid member of the named social networking group, that the disconnected member is untrusted.

5. The computer-implemented method of claim 1, further comprising removing the disconnected member from the named social networking group based on determining that the disconnected member of the social graph is not the valid member of the named social networking group.

6. The computer-implemented method of claim 1, further comprising hiding the named social networking group from the disconnected member based on determining that the disconnected member of the social graph is not the valid member of the named social networking group.

7. The computer-implemented method of claim 1, further comprising weighting the social graph based on at least one connection on the social networking platform within the named social networking group.

8. The computer-implemented method of claim 1, wherein the plurality of connections on the social networking platform comprise at least one of:

a social networking platform relationship;

a message;

a wall post;

a comment;

shared profile information;

membership in an additional named social networking group.

9. The computer-implemented method of claim 1, further comprising:

intercepting a message from a user intended for the named social networking group;

sending the message to a subset of the plurality of members of the named social networking group excluding at least one untrusted member based on at least one previous negative social networking platform interaction between the user and the untrusted member.

10. A system for validating members of social networking groups:

the system comprising:

an identification module programmed to identify a named social networking group on a social networking platform, the named social networking group comprising a plurality of members of the social networking platform;

a creation module programmed to create a social graph of the named social networking group based at least in part on a plurality of connections on the social networking platform between a plurality of members of the named social networking group;

a connection determination module programmed to determine a connecting member of the named social networking group that exceeds a predetermined threshold of connections within the named social networking group on the social networking platform;

a removing module programmed to remove, based on determining that the connecting member of the named social networking group exceeds the predetermined threshold, the connecting member of the named social networking group from the social graph;

a validity determination module programmed to determine that a disconnected member of the social graph is not a valid member of the named social networking group, based on the disconnected member not meeting a second predetermined threshold of connections within the social graph after having removed the connecting member from the social graph;

at least one processor configured to execute the identification module, the creation module, the connection determination module, the removing module and the validity determination module.

11. The system of claim 10, further comprising:

a determination module programmed to determine that the disconnected member is an owner of the named social networking group;

the determination module is programmed to determine, based on the disconnected member being the owner, that the named social networking group is untrusted.

12. The system of claim 10, further comprising:

an interception module programmed to intercept a message intended for the named social networking group;

a sending module programmed to send the message to a subset of the plurality of members of the named social networking group excluding at least the disconnected member.

13. The system of claim 10, further comprising a warning module programmed to warn a user, based on determining that the disconnected member of the social graph is not the valid member of the named social networking group, that the disconnected member is untrusted.

14. The system of claim 10, further comprising a member removing module programmed to remove the disconnected member from the named social networking group based on determining that the disconnected member of the social graph is not the valid member of the named social networking group.

15. The system of claim 10, further comprising a hiding module programmed to hide the named social networking group from the disconnected member based on determining that the disconnected member of the social graph is not the valid member of the named social networking group.

16. The system of claim 10, further comprising a weighting module programmed to weight the social graph based on at least one connection on the social networking platform within the named social networking group.

17. The system of claim 10, wherein the plurality of connections on the social networking platform comprise at least one of:

a social networking platform relationship;

a message;

a wall post;

a comment;

shared profile information;

membership in an additional named social networking group.

18. The system of claim 10, further comprising:

an interception module programmed to intercept a message from a user intended for the named social networking group;

a sending module programmed to send the message to a subset of the plurality of members of the named social networking group excluding at least one untrusted member based on at least one previous negative social networking platform interaction between the user and the untrusted member.

19. A non-transitory computer-readable-storage medium comprising one or more computer-readable instructions that, when executed by at least one processor of a computing device, cause the computing device to:

identify a named social networking group on a social networking platform, the named social networking group comprising a plurality of members of the social networking platform;

create a social graph of the named social networking group based at least in part on a plurality of connections on the social networking platform between a plurality of members of the named social networking group;

determine a connecting member of the named social networking group that exceeds a predetermined threshold of connections within the named social networking group on the social networking platform;

remove, based on determining that the connecting member of the named social networking group exceeds the predetermined threshold, the connecting member of the named social networking group from the social graph;

determine that a disconnected member of the social graph is not a valid member of the named social networking group, based on the disconnected member not meeting a second predetermined threshold of connections within the social graph after having removed the connecting member from the social graph.

20. The non-transitory computer-readable-storage medium of claim 19, wherein the one or more computer-readable instructions cause the computing device to:

determine that the disconnected member is an owner of the named social networking group;

determine, based on the disconnected member being the owner, that the named social networking group is untrusted.

* * * * *